United States Patent
Molina et al.

(10) Patent No.: US 8,522,018 B2
(45) Date of Patent: *Aug. 27, 2013

(54) METHOD AND SYSTEM FOR IMPLEMENTING A MOBILE TRUSTED PLATFORM MODULE

(75) Inventors: Jesus Molina, Washington, DC (US); Hou Cheng Lee, Baltimore, MD (US); Jonathan R. Agre, Brinklow, MD (US)

(73) Assignee: Fujitsu Limited, Kawasaki-shi (JP)

( * ) Notice: Subject to any disclaimer, the term of this patent is extended or adjusted under 35 U.S.C. 154(b) by 1223 days.

This patent is subject to a terminal disclaimer.

(21) Appl. No.: 11/840,823

(22) Filed: Aug. 17, 2007

(65) Prior Publication Data
US 2008/0046581 A1 Feb. 21, 2008

Related U.S. Application Data

(60) Provisional application No. 60/822,874, filed on Aug. 18, 2006.

(51) Int. Cl.
*G06F 7/04* (2006.01)
*G06F 15/16* (2006.01)
*H04L 9/00* (2006.01)
*H04L 9/32* (2006.01)

(52) U.S. Cl.
USPC ........... 713/168; 713/100; 713/164; 713/165; 713/172; 726/1; 726/2; 726/3; 726/4; 709/203; 709/226; 709/227; 709/229; 718/1

(58) Field of Classification Search
USPC ..... 713/164, 165, 168, 2, 150, 194; 709/203, 709/226–229; 726/1–4, 21
See application file for complete search history.

(56) References Cited

U.S. PATENT DOCUMENTS

| | | | |
|---|---|---|---|
| 7,028,149 B2 | 4/2006 | Grawrock et al. | |
| 7,222,062 B2 * | 5/2007 | Goud et al. | 703/23 |
| 7,552,326 B2 * | 6/2009 | Liu et al. | 713/164 |
| 7,552,419 B2 | 6/2009 | Zimmer et al. | |
| 7,603,707 B2 | 10/2009 | Seifert et al. | |
| 7,849,312 B2 | 12/2010 | Maletsky et al. | |
| 2003/0074548 A1 * | 4/2003 | Cromer et al. | 713/1 |
| 2003/0188113 A1 | 10/2003 | Grawrock et al. | |
| 2003/0229802 A1 * | 12/2003 | Challener et al. | 713/200 |
| 2005/0210467 A1 | 9/2005 | Zimmer et al. | |
| 2005/0213768 A1 * | 9/2005 | Durham et al. | 380/278 |
| 2005/0216736 A1 * | 9/2005 | Smith | 713/168 |
| 2005/0283826 A1 * | 12/2005 | Tahan | 726/2 |
| 2006/0053277 A1 * | 3/2006 | Wang et al. | 713/2 |
| 2006/0075223 A1 * | 4/2006 | Bade et al. | 713/162 |
| 2006/0085844 A1 | 4/2006 | Buer et al. | |
| 2006/0107032 A1 | 5/2006 | Paaske et al. | |

(Continued)

OTHER PUBLICATIONS

Ahmad-Reza et al, "Design and Implementation of a Secure Linux Device Encryption Architecture", pp. 1-10, Linux Tag, 2006.*

(Continued)

*Primary Examiner* — Philip Chea
*Assistant Examiner* — Shanto M Abedin
(74) *Attorney, Agent, or Firm* — Baker Botts L.L.P.

(57) ABSTRACT

A method for implementing a mobile trusted platform module includes establishing a connection with a first remote host device via a remote interface. The method also includes authenticating the connection. The method further includes, upon authenticating the connection, allowing the first remote host device to access a securely stored first application within a mobile trusted platform module.

40 Claims, 2 Drawing Sheets

(56) References Cited

U.S. PATENT DOCUMENTS

| | | | |
|---|---|---|---|
| 2006/0136717 | A1 | 6/2006 | Buer et al. |
| 2006/0212939 | A1* | 9/2006 | England et al. .................. 726/22 |
| 2006/0236092 | A1* | 10/2006 | Hamalainen ................... 713/151 |
| 2006/0256106 | A1* | 11/2006 | Scarlata et al. ............... 345/418 |
| 2007/0006169 | A1* | 1/2007 | Iliev et al. ..................... 717/131 |
| 2007/0016766 | A1* | 1/2007 | Richmond et al. ............ 713/100 |
| 2007/0042754 | A1* | 2/2007 | Bajikar et al. ................ 455/411 |
| 2007/0174600 | A1 | 7/2007 | Williams et al. |
| 2007/0192580 | A1 | 8/2007 | Challener et al. |
| 2007/0204153 | A1* | 8/2007 | Tome et al. ................... 713/164 |
| 2007/0223519 | A1 | 9/2007 | Wang et al. |
| 2007/0226496 | A1* | 9/2007 | Maletsky et al. ............. 713/168 |
| 2007/0300069 | A1* | 12/2007 | Rozas ........................... 713/176 |
| 2008/0046752 | A1* | 2/2008 | Berger et al. ................. 713/186 |
| 2008/0046898 | A1* | 2/2008 | Molina et al. ................. 719/330 |
| 2009/0328145 | A1* | 12/2009 | Berger et al. ...................... 726/3 |

OTHER PUBLICATIONS

Nicolai Kuntze et al, "Trusted Computing in Mobile Action", pp. 1-12, Proceedings of the Information security South Africa (ISSA) conference, 2006.*

TCG Best Practices Committee, "Trusted Computing Group Information—Version 2.0", pp. 1-13, Trusted Computing Group, 2005.*

Stefan Berger et al, vTPM: Virtualizing the Trusted Platform Module, IBM Research Report, Feb. 2006.*

Molina, et al., "Method and System for Implementing an External Trusted Platform Module," filed Aug. 17, 2007.

Maheshwari, et al., "How to Build a Trusted Database System on Untrusted Storage," http://www.usenix.org/events/osdi2000/full_papers/maheshwari/maheshwari.pdf, 2000.

Rau, "The Trusted Computing Platform Emerges as Industry's First Comprehensive Approach to IT Security," IDC Executive Brief, © 2006 IDC, https://www.trustedcomputinggroup.org/news/Industry_Data/IDC_448_Web.pdf, 2006.

Kay, How to Implement Trusted Computing, A Guide to Tighter Enterprise Security, Endpoint Technologies Associates. https://www.trustedcomputinggroup.org/news/Industry_Data/Implementing_Trusted_Computing_RK.pdf, 2006.

Oltsik, "Trusted Enterprise Security," White paper, The Enterprise Strategy Group, Jan. 2006. https://www.trustedcomputinggroup.org/news/Industry_Data/ESG_White_Paper.pdf, 2006.

"Trusted Platform Module FAQ," Trusted Computing Group: TPM FAQ, https://www.trustedcomputinggroup.org/faq/TMPFAQ/, Jul. 31, 2006.

Molina et al., U.S. Appl. No. 11/840,810, Non-final Office Action from U.S. Patent and Trademark Office dated May 25, 2011.

Molina et al., U.S. Appl. No. 11/840,810, Response mailed Aug. 25, 2011 to Non-final Office Action from U.S. Patent and Trademark Office dated May 25, 2011.

* cited by examiner

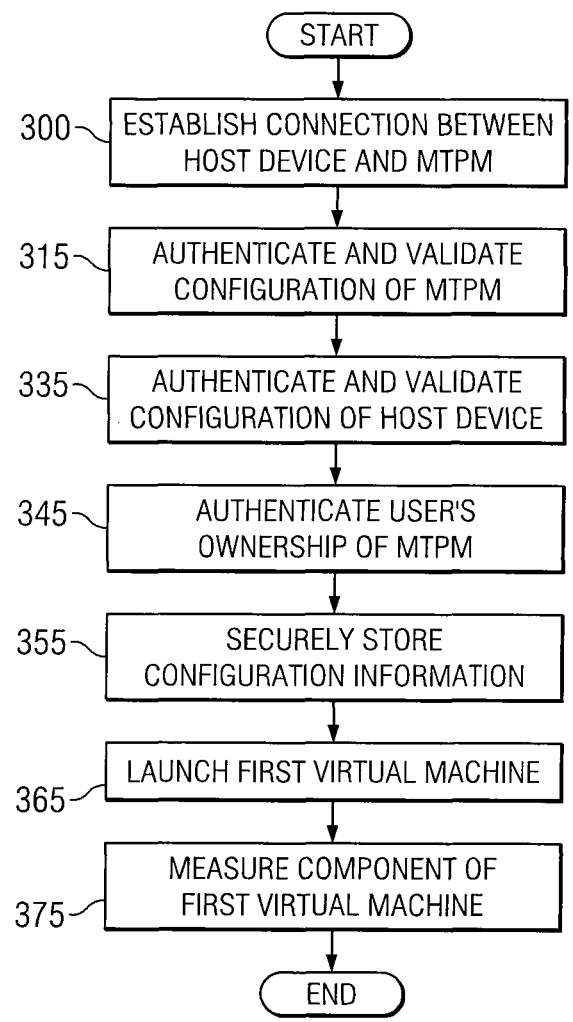

METHOD AND SYSTEM FOR IMPLEMENTING A MOBILE TRUSTED PLATFORM MODULE

RELATED APPLICATIONS

This application claims priority to U.S. Patent Application Ser. No. 60/822,874, entitled "METHOD AND SYSTEM FOR IMPLEMENTING A MOBILE TRUSTED PLATFORM MODULE," which was filed on Aug. 18, 2006.

TECHNICAL FIELD OF THE INVENTION

This invention relates generally to computer security and, more particularly, to a method and system for implementing a mobile trusted platform module.

BACKGROUND

The Trusted Platform Module (TPM) chip is hardware typically installed as part of a computing device such as a laptop or desktop PC (and potentially in devices such as cell phones and PDAs). The TPM chip is used to provide trusted information on the identity and internal state of the computing device in order to validate the current hardware and software. Current implementations of the TPM architecture assume physical bindings between the TPM chip and a single hardware platform. The TPM chip is typically installed as part of a system (e.g. a chip on the PCI bus) and is used to provide trusted information on the identity and internal state of the device and to store cryptographic secrets and identities. This is expected to increase the ability to defend against viruses and other security attacks and to verify the installed software. The TPM chip in personal computers (laptops, desktop PCs) is already on the market and their use is increasing rapidly. Moreover, security systems utilizing TPM functionality are beginning to be deployed for applications which require enhanced levels of data security, such as medical record handling. The most common implementation of a TPM is a chip physically attached to a computer. The TPM functionality is accessed by software using a well defined command set. Through this command set, the TPM chip provides cryptographic functionality such as encrypting, signing, key generation and random number generation. The TPM chip can also store a limited amount of information in a non-volatile-space.

Additionally, the TPM chip contains a set of extensible Platform Configuration Registers (PCRs). PCRs are used to store measurements on the current status of the platform. PCRs are reset when the system powers up and can only be extended, but never directly modified. The measurements stored in the PCRs are performed by each parent before handing off control to other components. The first measuring entity of the platform is trusted by default, as it is not previously measured by any other entities. This early measuring entity is called the Core Root of Trust (CRT) for measurement. For security, the CRT may be stored inside the TPM chip itself. After the first measurement by the CRT all software entities launched are expected to continue the chain of trust by extending the PCR registers before launching any other software. Each measurement is recorded and can be cryptographically verified using the PCRs by a verification party. The action of sending these measurements to a verification party for verification is called attestation.

The Trusted Computing Group (TCG) has defined open standards for hardware-based system security. The specifications provided by the TCG center around the TPM chip and its functionality. More specifically, the TCG bases its standards on the TPM chip as the hardware root-of-trust. While the TCG's standard is based on a physical TPM chip, there has been some work done with software based TPM emulators. Software based TPM emulators mimic the behavior of a real TPM chip as seen from the driver interface. These software based TPM emulators are typically installed and executed in and on the device that is running the application that needs the TPM functionality provided by the software based TPM emulator.

The mobile working group of the TCG is developing standards for implementing TPM functionality on portable devices. Current implementations of TPM functionality rely on the use of the same platform because the bindings between the system and the TPM chip are physical. Thus, keys and cryptographic identities are stored locally in the TPM and possibly bound to the current state of the system. In order to overcome this limitation, the TCG provides migration features as part of the standard in order to import and export keys and identities if they are marked as migratable. However, the time consumption and logistic problems related to acquiring the authorization to port to an unknown but trusted platform makes it unfeasible for jobs that require constant mobility between different platforms. Additionally, mobile workers may be required to work with unknown platforms where secrets cannot be changed and internal states cannot be modified. This undermines the security features that the TPM might provide for the mobile worker, and in some instances may even prevent the platform from being utilized at all if the attestation is performed remotely.

Another potential solution is to simply export the TPM functions and implementation application program interface (API) to an external mobile cryptographic coprocessor (e.g. a smart card). This external device might have some sort of secure storage, providing the solution for mobile keys and identities. This approach, however, is not compatible with the TCG standards for several reasons (e.g., sealing to the platform state is not possible, as the state of the platform will change for each system where the device is connected). Moreover, the measurements and attestation which are a core part of the TCG standards could not be met by this simple architecture, because the underlying trusted computing base will most likely be unknown. Additionally, the existence of another TPM on the system connected to the device may create conflicts which will bring the machine to an incorrect state.

Yet another solution may be to use an external TPM that may provide the TPM functions and implementation API and possibly secure storage. However, for security applications this approach is not compatible with the TCG standards for several reasons (e.g., sealing to the platform state is not possible, as the state of the platform will change for each system where the device is connected). Another possible problem is that the underlying Trusted Computing Base (TCB) will most likely be unknown. Finally, the existence of another TPM on the system where the external TPM is to be connected may, in some circumstances, create a conflict of operation.

The use of virtual machine monitors (VMM) (also called hypervisors) is exploding and their use is now pervasive in distributed environments and servers. For example, stock operating systems like Redhat include the Xen hypervisor by default. A hypervisor allows other operating systems to run in parallel on top of it and offers a strong isolation between the running operating systems. In the field of portable environments a notable recent work is SoulPad. The SoulPad architecture proposes dividing the computing environment into static carcasses formed by the hardware (denoted in the paper as EnviroPCs) and a mobile "soul." The mobile soul is implemented using a bootable USB hard disk, composed of an operating system to configure the underlying hardware, and a virtualized operating system on top of it for flexibility to choose between operating systems. The only protection to the portable system is a password which decrypts the virtualized operating system. In the paper, they suggest as future work querying a possible TPM on the EnviroPC for correctness of the BIOS. Other commercial approaches exist to provide portable environments. However none of these approaches, including SoulPad, exploit trusted computing standards.

SUMMARY OF THE DISCLOSURE

Particular embodiments provide a method and system for implementing a mobile trusted platform module that substantially eliminates or reduces at least some of the disadvantages and problems associated with previous methods and systems.

In accordance with a particular embodiment, a method for implementing a mobile trusted platform module includes establishing a connection with a first remote host device via a remote interface. The method also includes authenticating the connection. The method further includes, upon authenticating the connection, allowing the first remote host device to access a securely stored first application within a mobile trusted platform module.

In accordance with some embodiments, a method for implementing a mobile trusted platform module includes running a virtual machine monitor. The method also includes establishing a connection with a mobile trusted platform module (MTPM) device via a remote interface. The method additionally includes launching a first virtual machine from the MTPM. The method further includes monitoring the first virtual machine via the virtual machine monitor. The method also includes running at least one application within the first virtual machine.

Technical advantages of particular embodiments include providing a user with a mobile trusted platform to establish a trusted computing environment in a host computer with a TPM or with a host computer that does not have its own TPM chip. Another technical advantage of particular embodiments includes allowing the user to take the mobile trusted platform with them when they are finished using the host computer. Accordingly, the user's data may be kept with the user, safely stored within the mobile trusted platform. Yet another technical advantage of particular embodiments includes providing a user with a mobile device which he can use to establish a trusted computing environment. Accordingly, in an emergency situation the user may not have to spend time searching for, and configuring, an unfamiliar computer that can be used for trusted computing.

Certain embodiments of the invention may include all, some, or none of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which:

FIG. 3 is a flowchart illustrating a method for implementing a mobile trusted platform module, in accordance with particular embodiments.

DETAILED DESCRIPTION OF THE DRAWINGS

Figure 1:
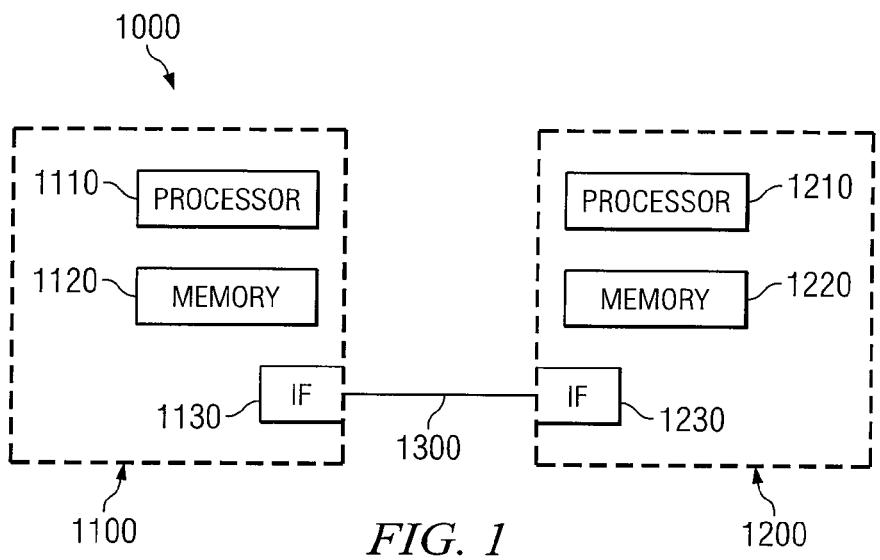
FIG. 1 is a block diagram illustrating a system implementing a mobile trusted platform module, in accordance with particular embodiments.

FIG. 1 is a block diagram illustrating a system implementing a mobile trusted platform module (MTPM), in accordance with a particular embodiment. System 1000 includes host computer 1100 and MTPM 1200. Host computer 1100 may be any type of computing device such as a desktop PC, a laptop, a personal data assistant (PDA), cell phone, or any other device capable of storing and/or processing electronic data. In particular embodiments, host computer 1100 may be any computing device featuring a TPM chip with a trusted bootloader such as Trusted Grub (Trusted Grub is a bootloader that may be used to measure and extend the operating system). MTPM 1200 may also be any type of computing device capable of storing and/or processing data to implement TPM functionality. In some embodiments MTPM 1200 may be implemented using a small computing device such as a Gumstix based computer (e.g., a Waysmall embedded arm-Linux platform featuring a Multi Media Card slot, USB device plug, and serial port within a case approximately 15 mm×36 mm×83 mm). Host computer 1100 and MTPM 1200 may be coupled via connection 1300. Connection 1300 may be a wireless or wireline connection.

By connecting MTPM 1200 to host computer 1100, a user may be able to switch between several different host devices while still maintaining a certain level of trust and security. This trust and security is based, in part, on the ability of MTPM 1200 to conform to the TPM standards set forth by the Trusted Computing Group (TCG). This may involve MTPM 1200 binding and/or sealing a virtual machine to itself. The virtual machine may then only be accessed with the secret authorization information provided by the owner of the MTPM. Once authorized, the virtual machine may be launched by host computer 1100 when host computer 1100 and MTPM 1200 are connected and verified. Once connected and the virtual machine is launched on host computer 1100, MTPM 1200 may function as the TPM device for host computer 1100 regardless of whether or not host computer 1100 already contains an internal TPM. Even though MTPM 1200 may be acting as host computer 1100's TPM device, applications on host computer 1100 run as though they were communicating with an internal TPM device built into host computer 1100. The trust and security provided by MTPM 1200 may continue even after it has been disconnected from host computer 1100. This may be accomplished, in part, by MTPM 1200 storing certain secure data (e.g., keys) within memory 1220 or an internal TPM (not depicted). Because secure data is stored within MTPM 1200, instead of within host computer 1100, the user may be able to take the data with him. This may allow the user to not have to worry about someone else using host computer 1100 to uncover the secure data or to need to use a complicated key migration scheme to move the keys.

MTPM 1200 may optionally include a TPM device as part of its implementation of TPM functions. In other embodiments, MTPM 1200 may implement a TPM emulator in software for certain TPM functions. A TPM device may be any combination of hardware, software, and/or encoded logic operable to provide TPM functionality. For example, a TPM device may be a TPM microchip or a TPM emulator. As a TPM emulator the TPM device may rely solely on the components of its respective host (e.g. processor 1110 and memory 1120) or it may have some hardware dedicated for its use in emulating a TPM. The type of TPM device used by host computer 1100 and MTPM 1200 may be different from one another. For example, host computer 1100 may have a TPM microchip while MTPM may have a TPM emulator. It may also be noted that in particular embodiments host computer 1100 and/or MTPM 1200 may not include a TPM device.

Host computer 1100 and MTPM 1200 may be connected either before or after host computer 1100 has been booted, depending on the desired level of security between MTPM 1200 and host computer 1100. The lower in the stack (closer to the BIOS level) MTPM 1200 is installed, the less validation information there may be to exchange and verify between host computer 1100 and MTPM 1200. In some embodiments, this may affect the Core Root of Trust (CRT). Ideally, the CRT begins by measuring the BIOS. The resulting metric or value may then be stored in a platform configuration register (PCR) along with the measurements of the other levels of the software stack. Often times, MTPM 1200 may be connected after host computer 1100 has booted. Accordingly, in particular embodiments MTPM 1200 may copy the metrics stored within the PCRs of a TPM microchip within host computer 1100 that were measured prior to connecting the MTPM 1200. MTPM 1200 may then verify these measurements, either internally or by checking with a third party that is capable of determining whether the measurements are correct. Once validated in this manner the CRT may be extended to include software methods residing on host computer 1100. In this way, the integrity of the remote host machine is validated using the MTPM 1200, providing a trusted base on the remote host.

Host computer 1100 is depicted as having processor 1110, memory 1120, and interface 1130. Similarly, MTPM 1200 is depicted as having processor 1210, memory 1220, and interface 1230. When running an application on host computer 1100, these components may work together, passing information between one another, to generate, receive, and/or process TPM requests/responses from a mobile TPM device, such as MTPM 1200. This may allow a user of MTPM 1200 to establish secure computing environments on different host computers, regardless of whether or not the host computer includes an internal TPM.

Processor 1110 may control the operation and administration of host computer 1100 by processing information and signals received from a user and/or one or more programs or applications running on host computer 1100. Processor 1210 may control the operation and administration of MTPM 1200 by processing information and signals received from host computer 1100 and/or a user via interface 1230. Processors 1110 and 1210 may include any suitable hardware, software or logic, in any desired combination, used to control and process signals. For example, processors 1110 and 1210 may be programmable logic devices, microcontrollers, microprocessors, any suitable processing devices or resources, or any combination of hardware, software and/or encoded logic. Processors 1110 and 1210 may be similar, or different, types of devices. For example, processor 1110 may be a microprocessor, and processor 1210 may be a microcontroller. In particular embodiments, processor 1110 may be used in combination with memory 1120 to run an application stored within memory 1120 that requires TPM functionality and to facilitate passing any TPM requests to MTPM 1200 via connection 1300. In some embodiments, processor 1210 may be used in combination with memory 1220 to process any received TPM requests and to generate a response to be sent back to host computer 1100 via connection 1300.

Memory 1120 and 1220 may be any form of volatile or non-volatile memory including, without limitation, magnetic media, optical media, random access memory (RAM), read-only memory (ROM), removable media, or any other suitable local or remote memory component. Memory 1120 may store any suitable information to implement features of various embodiments, such as programs that may launch or manage virtual machines, programs that may use TPM functionality and/or any instructions that may be needed to carry out one or more of the TPM functions. Memory 1220 may store any suitable information to implement features of various embodiments, such as encryption/decryption keys, identities, passwords, digital certificates, and/or state information. In some embodiments memory 1220 may store a secure image of a virtual machine environment and any applications that may run in this virtual machine environment. In some embodiments, memory 1120 and/or 1220 may include a secure memory partition that may be used in a high-priority, high-security mode (e.g., a medical emergency).

Connection 1300 may be a wireless or wireline connection between host computer 1100 and MTPM 1200. Connection 1300 may allow host computer 1100 and MTPM 1200 to pass control signals and data between each other. More specifically, host computer 1100 may send a common TPM command to MTPM 1200 through connection 1300, and MTPM 1200 may send its response to host computer 1100 through connection 1300. For example, in a particular scenario the application being run on host computer 1100 may request a key stored by MTPM 1200. The request for the key may be sent to MTPM 1220 via connection 1300, and in response MTPM 1200 may send the requested key back to host computer 1100 via connection 1300. In some embodiments connection 1300 may include added security, such as encryption using shared keys. This may help to reduce and/or prevent tampering with connection 1300, the data passed there through, and/or MTPM 1200.

Interfaces 1130 and 1230 may be any port or connection, real or virtual, including any suitable hardware and/or software that may allow host computer 1100 and MTPM 1200 to exchange information and/or signals with one another. For example, interfaces 1130 and 1230 (and connection 1300) may be universal serial bus (USB) interfaces, FireWire interfaces, Ethernet interfaces, peripheral component interconnect (PCI) interfaces, memory bus interfaces, serial interfaces, parallel interfaces, Bluetooth interfaces, radio frequency interfaces, or any other interfaces that may allow any other type of wired or wireless connection.

Modifications, additions, or omissions may be made to system 1000. For example, system 1000 may include any suitable number of host computers 1100 or MTPMs 1200. As another example, host computer 1100 may include any suitable number of additional components, such as an input port for receiving user input and an output port for facilitating a graphical user interface. Additionally, the operations and functionality of system 1100 may be performed using any suitable logic.

Figure 2:
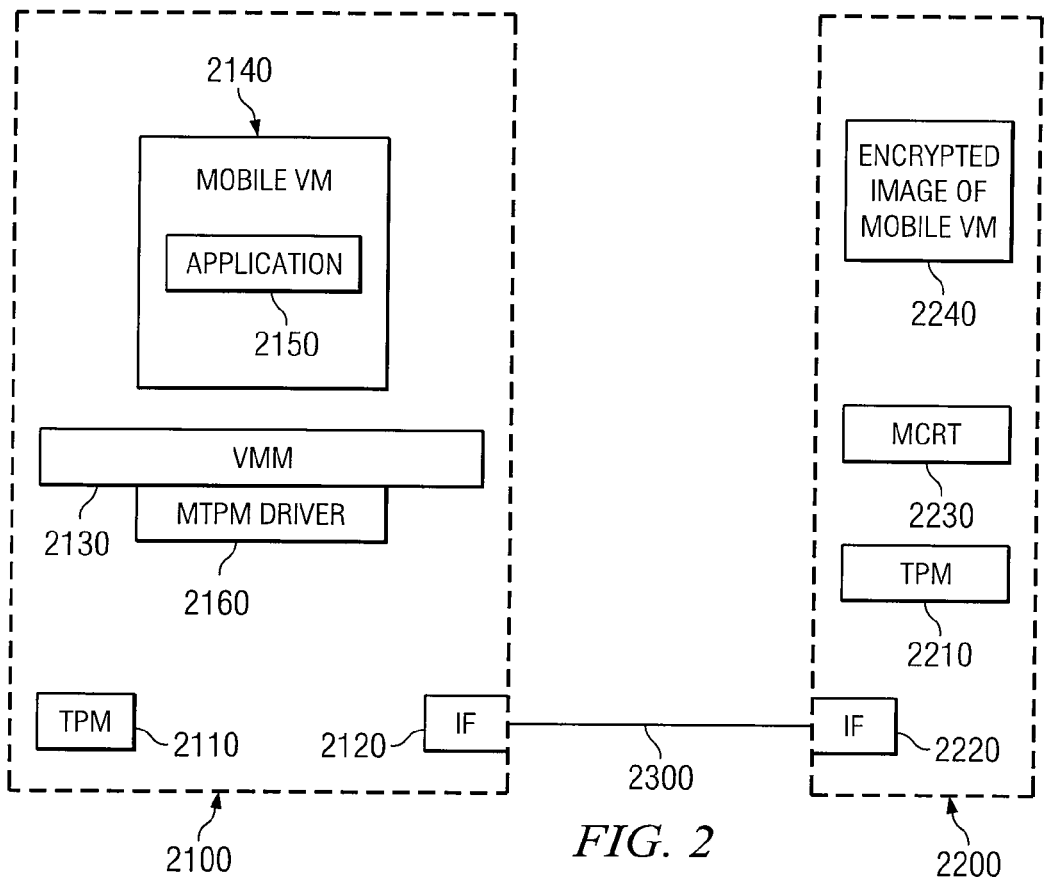
FIG. 2 is a detailed block diagram illustrating functional components of the system for implementing the mobile trusted platform module depicted in FIG. 1, in accordance with particular embodiments.

FIG. 2 is a detailed block diagram illustrating functional components of the system for implementing the mobile trusted platform module depicted in FIG. 1, in accordance with particular embodiments. Similar to the arrangement and coupling of host computer 1100 and MTPM 1200 in FIG. 1, system 2000 includes host computer 2100 which is connected to MTPM 2200 via connection 2300. Furthermore, host computer 2100 and MTPM 2200 may have corresponding internal hardware components that may execute analogous software/logic in a manner similar to host computer 1100 and MTPM 1200, respectively.

Host computer 2100 may include its own housing and any additional components (e.g., a processor and memory) necessary to provide the functionality described herein. Some of these components, such as TPM device 2110 and interface 2120 are depicted in FIG. 2. The components of host computer 2100 may provide the resources needed by virtual machine monitor 2130, virtual machines 2140, applications 2150 and MTPM driver 2160. These components, when used together, may allow host computer 2100 to create a separate mobile virtual machine 2140 for running application 2150 when host computer 2100 is connected to MTPM 2200. Once MTPM 2200 has been connected and validated and application 2150 has begun, host computer 2100 may begin sending TPM requests to MTPM 2200, instead of TPM device 2110, as though it were a built-in TPM microchip. More specifically, from the perspective of application 2150 there may not be a functional difference between MTPM 2200 and TPM device 2110.

TPM device 2110 may be a physical TPM chip built into the hardware of host computer 2100. For example, TPM device 2110 may be attached to a motherboard or on a PCI bus within host computer 2100. In some embodiments, TPM device 2110 may follow the standards for trusted computing set forth by the Trusted Computing Group (TCG). To better take advantage of the benefits provided by TPM device 2110, computer 2100 may include a BIOS and bootloader with TCG capabilities, such as the Grub Bootloader. In some embodiments, the TPM chip may not be included.

Virtual machines 2140 may be software programs designed to emulate hardware. This may allow host computer 2100 to emulate multiple computers by running multiple virtual machines. In this method, host computer 2100 may link mobile virtual machine 2140 to a physical but mobile TPM, such as MTPM 2200, instead of to TPM device 2110 or to a virtual TPM as may be done by others.

Virtual machine monitor 2130 (VMM 2130) may be a software program, such as Xen or sHype that allows host computer 2100 to be able to keep various virtual machines separated. In some embodiments VMM 2130 may comprise a hypervisor running multiple operating systems. The use of VMM 2130 may allow multiple operating systems to remain separate and isolated from one another (similar to if they were on different computers). Without VMM 2130 host computer 2100 may not be able to run multiple virtual machines in parallel with one another. In those situations in which host computer 2100 does not include VMM 2130, some embodiments of MTPM 2200 may include an automatic booting mechanism that uses a fully virtualized environment, like VMware. For this to work there may need to be a guest operating system (e.g., an operating system that will launch the platform instead of VMM 2130). In some embodiments VMM 2130 may include an emergency mode. This may allow a user requiring emergency services (e.g. police or a health care provider) to launch VM 2140, and any additional internal services, in a high priority, high security mode (for example, using secure memory). In some embodiments, this may be triggered by the user authenticating himself as a user requiring an emergency service when MTPM 2200 is connected to host computer 2100.

Application 2150 may be any type of application that supports and/or uses TPM functionality, such as an encrypted data management program or a secure e-mail program. For example, application 2150 may be a database program for storing, retrieving and editing encrypted data that may be decrypted using a key requested from MTPM 2200. Application 2150 may be running independently of any other applications because each of the applications may be running within its own virtual machine. As may be apparent, because application 2150 may be running independently of other applications it may generate separate requests for TPM functionality. Furthermore, these requests may be routed to different TPM devices. More specifically, TPM requests from one application may be handled by TPM device 2110, and TPM requests from another application may be sent to MTPM 2200.

MTPM driver 2160 may perform several different functions in the initialization, configuration, connection establishment and validation process of MTPM 2200. MTPM driver 2160 may allow application 2150 to interact with MTPM 2200 as though MTPM 2200 were a TPM chip built into host computer 2100. MTPM driver 2160 may include other drivers that provide a standardized method for application 2150 to access a TPM (e.g., MTPM 2200) and take advantage of its capabilities. MTPM driver 2160 may also include TPM driver libraries to translate TPM requests received from application 2150b into TPM commands that MTPM 2200 may be able to understand. For example, when MTPM driver 2160 receives a TPM request from application 2150 for a key to decrypt a file, MTPM driver 2160 may generate the appropriate TPM command to be sent to MTPM 2200. TPM Driver 2160 may also receive requests for information stored in TPM device 2110, such as for PCR values. Because host computer 2100 includes TPM device 2110, MTPM driver 2160 may also determine which TPM device (TPM device 2110 or MTPM 2200) a particular TPM command is to be sent. When MTPM 2200 is connected to host computer 2100, MTPM Driver 2160 may search for a physical TPM on host computer 2100. Upon detecting TPM device 2110, MTPM Driver 2160 may read the current metrics stored on the lower PCRs of TPM device 2110. These metrics may then be sent to MTPM 2200 and copied into the corresponding PCRs of MTPM unit 2210. In processing the various TPM requests, MTPM driver 2160 may use various components of host computer 2100, such as a processor and memory.

Interfaces 2120 and 2220 may be similar to interfaces 1130 and 1230 of host computer 1100 and MTPM 1200 of FIG. 1, respectively. More specifically, interfaces 2120 and 2220 may represent any port or connection, real or virtual, including any suitable hardware and/or software that may allow host computer 2100 and MTPM 2200 to exchange information and signals with one another. For example, interfaces 2120 and 2220 may be universal serial bus (USB) interfaces, FireWire interfaces, Ethernet interfaces, peripheral component interconnect (PCI) interfaces, memory bus interfaces, serial interfaces, parallel interfaces, Bluetooth interfaces, radio frequency interfaces, or any other interfaces that may be used to implement any type of wired or wireless connection.

MTPM 2200 may be external to host computer 2100 and may include its own housing and any additional components (e.g., a processor and memory) necessary to provide the functionality described herein. This may allow MTPM 2200 to be a mobile/portable device. The components of MTPM 2200 may provide the resources needed by MTPM unit 2210, encrypted mobile virtual machine (VM) image 2240, and mobile core root of trust (MCRT 2230) to provide the functionality described herein. This functionality may include storing encryption keys and identities, providing keys to decrypt data, providing validation (attestation) capabilities including previously measured metrics from the system, adapting the capabilities of the standards set forth by the TCG to the mobile environment, providing security in the event of losing MTPM 2200 and minimizing the dependency on the trusted computing base outside MTPM 2200. These components and features, taken together, may allow a user to create a trusted computing environment, in accordance with the TPM standards, by simply connecting MTPM 2200 to host computer 2100. MTPM 2200 may be able to provide both security and mobility, in part, by securely storing keys and allowing them to be moved around without using complex migration algorithms. Furthermore, MTPM 2200 may enhance devices that use portable virtual machines to create personal environments in unknown machines by providing TPM standard security.

The security of MTPM 2200 may be enhanced through the use of brute force prevention mechanism to counter dictionary attacks (e.g., back-off times). Additionally, in the event MTPM 2200 is lost or stolen, an attacker may not have access to either the stored keys (securely stored in the TPM) or mobile VM image 2240 which may be encrypted with a key, which may be protected by, for example, wrapping using a Storage Root Key (SRK)). Having the keys wrapped may also prevent malicious attempts to replace the wrapped key because MCRT 2230 may detect a failure in the returned command by the TPM while decrypting. Additionally, to check that mobile VM image 2240 has not been modified, MCRT 2230 may perform such checks as verifying a signature for integrity using a preloaded vendor public key and verifying the measured value against either preloaded stored measurements or an external third party. Furthermore, some embodiments may employ the concept of locality which may allow only certain memory addresses to extend or reset the lower Platform Configuration Registers (PCRs) as all the measurements will be written into MTPM unit 2210's PCRs. As added security, some embodiments of MTPM 2200 may include biometric capabilities or public key infrastructure (PKI). This may allow MTPM 2200 to create a more secure binding between the user and MTPM unit 2210.

Because MTPM 2200 may be a mobile device able to connect to different host computers, it may need to be able to interact with different hardware, software and operating systems.

MTPM unit 2210 may include a TPM chip, similar to a built-in TPM chip (e.g., TPM device 2110) or a TPM emulator. The TPM emulator may be implemented in hardware (e.g., a kernel module for the x86 architecture), software (e.g., an open source TPM emulator), or a combination of both hardware and software. For example, MTPM unit 2210 may be implemented in separate hardware reserved solely for emulating a TPM microchip, or it may be implemented in software using the various components of MTPM 2200 that are used for other functions (e.g., the same processor or memory used by MCRT 2230) or it may be implemented using some combination of the above. As a TPM emulator, MTPM unit 2210 may process requests for particular TPM functionality, such as generating keys, in a manner similar to a TPM chip.

In some embodiments, MTPM unit 2210 may include a valid Endorsement Key from a manufacturer. This may allow MTPM 2200 to create attestation identities. Though MTPM 2200 may be able to comply with the provisions of the TPM standard (e.g., shielded locations), it may also include some minor internal changes to the TPM standard to support the mobility of MTPM 2200. Some of these changes are discussed below with respect to FIG. 3. For example, in particular embodiments when MTPM 2200 is performing attestation it may need to differentiate between the measurements and the state of host computer 2100 and the measurements and state of MTPM 2200. The attesting party, in certain cases, may require that complete measurements be from MTPM 2200.

Encrypted mobile VM image 2240 may comprise any components necessary to allow host computer 2100 to be able to run mobile VM 2140. For example, encrypted mobile VM image 2240 may be a VM that is bootable by VMM 2130 of host computer 2100. Depending on the embodiment all, some, or none of encrypted mobile VM image 2240 may be encrypted to avoid disclosure of data in the event MTPM 2200 is lost or stolen. For example, in some embodiments encrypted mobile VM image 2240 may be encrypted with a symmetric key. Encrypted mobile VM image 2240 may contain methods for requesting TPM functions that are specific to MTPM 2200. In some embodiments, encrypted mobile VM image 2240, residing within MTPM 2200, may include a TSS such as TrouSerS (TrouSerS is a Common Public License licensed Trusted Computing Software Stack program) and an Integrity Measurement Architecture (IMA) (IMA is a remote attestation mechanism) in the form of a kernel module for requesting TPM functions.

MCRT 2230 may be a small program (e.g., a bootloader or a microkernel) which may act as a manager for MTPM unit 2210 and as the first entry point for measurements on MTPM 2200. This implies that the MCRT 2230 may be trusted and may be the core root of trust for the MTPM 2200. Some embodiments may include a MCRT manager that may allow the uploading and storing of a VM and the erasing of a VM on MTPM 2200. The MCRT manager may also allow migrating secure information such as storage root keys, verifying ownership and controlling the attestation and validation process. MCRT 2230 may be able to access MTPM unit 2210 of MTPM 2200. MCRT 2230 may also be able to encrypt VM 2140 and decrypt a VM from within encrypted mobile VM image 2240. In order for MTPM 2200 to allow use of the VM, the user may need to be verified as the owner of the MTPM 2200. When MTPM 2200 is connected to host computer 2100, MCRT 2230 may check to see if an ownership flag has been asserted on MTPM unit 2210. If the ownership flag has not been asserted, MCRT 2230 may initiate a modified "take ownership" procedure (the process for taking ownership of a TPM is part of the TPM standard). In some embodiments this may also involve requesting a physical presence test (e.g. a switch in MTPM 2200). If the physical presence test is met, MCRT 2230 may request that a user enter a new shared authentication secret for a Storage Root Key (SRK). As a result, a SRK pair (a public and private SRK key) may be created and bound to the provided shared secret. MCRT 2230 may then request that a key be generated by MTPM unit 2210. The key generated by MTPM unit 2210 may then be used to encrypt the preloaded virtual machine 2140 and create the mobile VM image 2240. MCRT 2230 may then wrap the key using the created SRK public key. To utilize the SRK private key, and hence the VM, the user may need to provide the shared secret. In some embodiments, the shared secret authorizing the use of the SRK may be the basis of the cryptographic binding between MTPM 2200 and VM 2140. If the ownership flag is asserted, then the user may be asked to provide the previously registered shared authentication secret that is needed to unwrap the keys.

In particular embodiments, MCRT 2230 may contain an application that provides mechanisms to erase an old VM image and upload a new virtual machine. This may involve a rebinding between the new uploaded VM and MTPM 2200. This rebinding may be performed by encrypting the new VM with a cryptographic key, and then storing this key with MTPM unit 2210. This may be performed as a modified standard TPM "take ownership" procedure. In particular embodiments, MTPM 2200 may additionally further encrypt portions of the virtual machine and application, creating different security levels, and bind them to the MTPM unit 2210 using the current state of the MTPM 2200. Although the protocol to take ownership of a TPM contains provisions for confidentiality and integrity, to prevent attacks on the input itself it may be desirable for the MTPM ownership process to be performed on a trusted machine, such as host computer 2100. If ownership is verified, MTPM 2200 may support migrating and replacing virtual machines.

Migration may allow a user to transport a key from one TPM to another TPM. In the event the user wants to transfer keys from MTPM 2200 to another type of TPM, the migration procedure may be as described in the TCG specifications. While a SRK may be migrated using the maintenance commands (e.g., TPM MaintenanceArchive), those functions are optional, and may not be implemented on most TPMs. If these functions exist on the TPM and the target TPM or MTPM 2200 is from the same manufacturer, then it may be possible to migrate both the TPM data and the VM without the previous protocol.

The manager functions of MCRT 2230 may be used to control the access, configuration and/or other internal aspects of MTPM unit 2210. In some embodiments, MCRT 2230 may include an identification port that may allow a user to confirm his identity directly with MTPM 2200 (e.g., a keypad for entering a pass-code, or a fingerprint scanner for reading the user's fingerprint).

Upon connecting MTPM 2200 to host computer 2100, particular embodiments may use the various components depicted to leverage the benefits of mobile computing by using virtual machines 2140 along with the benefits of trusted computing. More specifically, combining TPM functionality with the use of virtual machines may allow a user to enjoy a secure and trusted environment which may be validated and where keys and identities may be stored securely by MTPM 2200. This may address difficulties of migration due to constant mobility by utilizing features of MTPM 2200 instead of complex key migration protocols. More specifically, secrets may be sealed to the mobile computing environment created via mobile VM 2140 and MTPM 2200, allowing a user to move the secrets and identities between different systems. Sealing may attach the current status of the mobile computing environment, as provided by the PCRs, to a stored secret in MTPM 2200. In some embodiments MTPM 2200 may only allow the secret to be retrieved if the current PCRs, which were bound to the secret, match the current PCR status of the virtual machine 2140 and the MTPM 2200. This may mitigate the security threats related to using mobile environments on untrusted machines, which may offer a high level of convenience and be of great help in emergency situations.

If MTPM 2200 was previously owned by a different user, the new user may modify the ownership by first clearing the previous ownership. This may be done by asserting a physical presence mechanism and calling the standard function TPM ForceClear and providing a secret authorization code to the MCRT 2230 for this purpose. Then, the new owner may use the same procedure described above to select a new SRK password. The old virtual machine, however, may become unusable as the BLOB containing the symmetric encryption key may be wrapped using the new SRK.

The following example may help to illustrate some of the features and benefits of particular embodiments. As may be apparent, because of the wide variety of applications/scenarios in which a MTPM device may be used, this example may not illustrate all benefits of all embodiments. For purposes of this example assume that a user needs a secure computing environment (e.g. a doctor to remotely assist in an operation). The user may find a suitable machine, such as host computer 2100, with an external interface (e.g. USB) through which he may connect his MTPM 2200. It should be noted that it may not be desired for MTPM 2200 to replace TPM device 2110 of host computer 2100, but to provide the user with a personal TPM.

Once MTPM 2200 has been connected to host computer 2100, a validation procedure may be initiated in which host computer 2100 validates MTPM 2200 and MTPM 2200 validates host computer 2100. This may include verification of device identities and attestation of the configurations of hardware and software. The procedure may also attempt to authenticate the user as the owner of MTPM 2200. For example, the user may be asked for a SRK password. Other embodiments may use other authentication mechanisms such as biometrics and certificates. After MTPM 2200 authenticates the user and unrestricted operations are allowed, any encrypted applications within MTPM 2200 may be decrypted and made available to be copied and launched by host computer 2100. For example, encrypted mobile VM image 2240 may be decrypted, copied to host as VM 2140, launched and application 2150 may be run. Software modules within VM 2140 may measure application 2150 and report to MTPM 2200.

After this, the chain of trust may be maintained by mobile VM 2140. In some embodiments this may be done by extending the PCRs of MTPM unit 2210. Retrieving the lower PCRs from TPM device 2110 may be a non-restricted operation, as may be extending the upper PCRs of MTPM unit 2210; hence no password or authentication method may be needed.

In some scenarios, host computer 2100 may not contain TPM device 2110. In such a scenario, any request for lower PCRs may return NULL. Accordingly, the lower PCRs (e.g., PCR0-8) may remain clear or set to NULL or 0. Because the lower PCRs are not filled, application 2150*b* may not be able to identify the underlying architecture from where MTPM unit 2210 was launched. This may result in application 2150 blindly trusting in the security of the BIOS, the Bootloader and VMM 2130 (items that typically would be in the lower PCRs). To help mitigate this blind trust MCRT 2230 may use an authentication protocol to verify the validity of VMM 2130. Additionally, MCRT 2230 may only allow encrypted mobile VM image 2240 to launch in a special state (e.g., read only mode). From the user's perspective, the functioning of the MTPM 2200 may appear to be similar to an actual TPM, so it may be desirable for the mobile VM 2140 to notify the user that this is operating on an untrusted machine.

Once the lower PCRs have been populated, the various components of mobile VM 2140 may be measured, reported to MTPM 2200 and extended into the upper PCRs (e.g., PCR9-PCR24) of MTPM unit 2210. From that point on, interactions between application 2150*b* and MTPM 2200 may be as provided in TPM standards. Because certain information may be securely stored in MTPM 2200 and not on host computer 2100 the user may be able to walk away from host computer 2100 once he is done without having to worry about the security of any of the work he has done.

While MTPM 2200 may allow an application running on mobile VM 2140 to interact with MTPM 2200 as though it were interacting with TPM device 2110 according to TPM standards, some internal functions of MTPM 2200 may be modified from the standards in order to accommodate the mobile nature of the MTPM. For example, sealing operations may differentiate between bindings that include lower PCRs and bindings that include upper PCRs. "TPM_Seal" and similar functions may only be able to seal the upper PCRs (e.g., PCRs 9-23). This may be because the lower PCRs, which are retrieved from the host machine, may be different between different platforms. However, certain applications may need the sealing operation on the lower PCRs. Accordingly, in some embodiments TPM functionality may be extended by using TPM_Seal_Mobile which may be a safe function for sealing in a mobile platform. This may allow, among other things, for mobile data to be sealed to the virtual machine state to allow it to be opened at home while avoiding the loss of any secret data stored therein. Software created for use with MTPM 2200 may employ a policy having a special function for binding to only lower PCRs, only upper PCRs or both, depending on the availability of the data and/or the capabilities of host computer 2100.

It may be recognized that system 2000 is merely an example configuration of a system in which a mobile TPM (MTPM 2200) is coupled with a host computer (host computer 2100), in accordance with particular embodiments. Other systems may include different components that may be arranged differently to accomplish the functionality and features described herein. For example, host computer 2100 may be running more than two virtual machines, or it may not include a built-in TPM chip. As another example, in some embodiments certain manufacturers may be labeled as normal users, while others may be given priority if they are vouched for by a medical, governmental or law enforcement agency. Some embodiments may include a cryptographic provider such as a libgmp library. Some embodiments may use a user-space port and create a "bounce driver" using netlink to be compatible with the TCG software stack architecture (TSS). As yet another example, some embodiments may use an Endorsement Key, contained in MTPM 2200, to provide information on the mobile nature of the MTPM 2200. Other embodiments may use an external network connection from host computer 2100 to contact a trusted third party for validation (attestation) purposes. Other embodiments may use an external network connection of MTPM 2200 to contact a trusted third party for validation (attestation) purposes. For example, the MTPM may be part of a mobile phone.

FIG. 3 is a flowchart illustrating a method for implementing a mobile trusted platform module, in accordance with particular embodiments. For purposes of this method it may be assumed that the mobile trusted platform module (MTPM) device is a self contained unit comprising an external casing protecting any hardware and software (e.g., the components described above with respect to FIG. 2) used by the MTPM device. For example, in some embodiments the MTPM device may comprise a Waysmall Gumstix device. As another example, in particular embodiments the MTPM device may be a mobile phone. This may allow a user to access a portable secure environment, without having to rely on software existing on the first host device. In some embodiments, the mobile phone may include a mechanism, such as a switch, to choose between booting as a TPM enabled phone or as a MTPM device. Furthermore, it may also be assumed that the first remote host device is running a virtual machine monitor (VMM) and contains an MTPM driver for interaction with the MTPM. The flowchart illustrates a possible sequence of steps that may be used to connect the MTPM to a host computer and to allow the host computer to execute the user's virtual machine environment securely stored on the MPTM.

The method begins at step 300 where a connection is established between the first remote host device and the MTPM device. The signaling/communications that pass between the MTPM device and the first host device may vary depending on the type of connection that is used. For example, there may be a different hand-shaking procedure used if the connection is established via USB interfaces as opposed to if the connection is established via Bluetooth interfaces. In order to let the MTPM device communicate with the first host device, some embodiments may include a client-server mode entry point. When the MTPM device is in the client-server mode, it may work as a server waiting for commands from the client, which may be an MTPM driver. Furthermore, in order to enhance the portability of the MTPM device, some embodiments may include a USBnet module in a Linux kernel within the MTPM device. The USBnet module may be used to simulate an Ethernet interface when the MTPM device connects to the first host device via a USB interface. This may enhance the portability of the MTPM device because the USBnet interface may be standard for both Linux and Windows.

Regardless of how the connection is established, once the MTPM device and the host device are able to send/receive messages between each other, the MTPM processor may launch the mobile core root of trust (MCRT). The MCRT may perform a self-check on the MTPM by making measurements on its internal configuration and current software. These measurements may be stored using the internal TPM. The MCRT may be similar to, and provide functionality similar to, MCRT 2230 discussed above with respect to FIG. 2. In some embodiments, the measurement of the MCRT may be stored in Platform Configuration Register 8 (PCR8) of the MTPM device.

In particular embodiments, the connection established at step 300 may initially be limited. More specifically, until the host device and MTPM device have authenticated and validated one another, the connection may be limited to the exchange of specific message related to the configuration of the MTPM device.

At step 315, the configuration of the MTPM may be authenticated and validated. This may be done by a MTPM driver on the host device which confirms the identity of the MPTM. This may be accomplished by requesting identity information such as an endorsement key from the MTPM. The host device may verify that the endorsement key is legitimate, either internally, or through communication with a third party (e.g., through a separate network link).

The MTPM driver may verify that the MTPM is valid by requesting that the MTPM provide its internal measurement data. The MCRT may collect, sign and provide the measurements to the MTPM driver. The MTPM driver may verify that these measurements are legitimate, either internally, or through communication with a third party for attestation (e.g., through a network link).

Based on the results of step 315, the MTPM driver may decide to block the MTPM or to proceed to step 335. In other words, if the MTPM driver is not able to authenticate or validate the MTPM then it may not allow the MTPM to communicate with the host device.

At step 335, the configuration of the host device may be authenticated and validated. If the host device contains a TPM, authenticating the MTPM may be done by requesting an endorsement key from the host device's TPM. The MTPM may then verify that the endorsement key is legitimate, either internally, or through communication with a third party (e.g., through a network link).

If the host device does not contain a TPM, then the host TPM driver may be configured with identity information that may be supplied to the MTPM.

The MTPM may also determine if the host device is valid in terms of its hardware and software configuration. If the host device contains a TPM, then the MTPM may simply request the measurements from the host MTPM Driver. The MTPM Driver may collect the measurements from the host TPM, sign the collection and deliver it to the MCRT of the MTPM. If the host device does not contain a TPM, then a NULL value may be delivered to the MTPM's MCRT. Once the measurements are received, the MCRT may verify the measurements, either internally, or through a third party (e.g., through a separate network link).

The MTPM device may also determine whether the host device contains a host TPM microchip. A TPM microchip may include as many as 25 Platform Configuration Registers (PCRs) numbered from PCR0 to PCR24. The lower PCRs, PCR0-PCR8, may contain measurements from the BIOS, bootloader and VMM of the host device, while the upper PCRs, PCR9-PCR24, may include measurements based on applications being run on the host device.

At step 345, the user's ownership of the MTPM may be authenticated. This may involve requesting the user provide identification information, such as a shared secret to determine whether this user is the owner of the MTPM. All further information may be encrypted for protection. The user may also be requested to enter identifying information such as a password or a biometric. This may be entered either through the host device to be delivered to the MTPM or directly into the MTPM. In some embodiments, the MTPM may receive a storage root key password from the user. This may be used to authenticate the user before any of the protected data and/or programs are decrypted and/or used. For example, in some embodiments a virtual machine may be encrypted thereby requiring the storage root key password before the virtual machine may be decrypted. More specifically, in some embodiments the storage root key may be bound to the shared authentication secret. The storage root key may be stored securely within the TPM device internal to the MTPM and may be used to encrypt/decrypt keys that may be stored outside of the MTPM device. In certain situations the host device may request the MTPM device to generate one of these keys. Other embodiments may use different techniques or methods to authenticate the user.

If the configurations/identities of the MTPM, host and user are successfully authenticated/verified then the process continues to step 355, otherwise the process may be terminated. At step 355, the MTPM may securely store the configuration information. This may involve the MTPM extending its PCRs with measurement values within the configuration information. If the host device comprises a host TPM microchip then, at step 355, the MCRT may store at least one PCR value from the host TPM microchip within a corresponding internal PCR of the TPM device of the MTPM. For example, the MTPM may store the values of PCR0-PCR8 of the host TPM microchip in PCR0-PCR8 of the internal PCRs of the MTPM. Depending on the embodiment the internal PCRs of the MTPM device may by implemented using a TPM microchip or a memory module within the MTPM.

If, on the other hand, the first remote host device does not include a host TPM microchip then, the internal PCRs of the MTPM may be set to NULL or 0. Because the MTPM was not able to load the lower PCRs from a host TPM microchip to the corresponding lower PCRs of the MTPM device the MTPM device may not be able to provide as high a level of security and trust. The MTPM may use these PCRs in operations such as sealing to the state of the machine.

At step 365, the first virtual machine (VM) may be launched. In doing so the host device may request that the MTPM make the VM available. The MTPM may extract the mobile VM image decryption key from its internal TPM. If the key is wrapped, then it may be unwrapped using key information in the internal TPM and authorized by the user. The MTPM may then decrypt the VM and provide the decrypted VM to the VMM of the host device. The VMM of the host device may then launch the VM and gain access to the application. In some embodiments, any code, commands, and/or data needed to boot the first virtual machine may be stored within the mobile virtual machine image stored on the MPTM. In particular embodiments, the host device may load, receive or otherwise gain access to the information within the MTPM device by launching the first virtual machine. The host device may use the VMM to isolate the first virtual machine from any other virtual machines currently running on the host device. Some embodiments may be able to perform even if the first host device does not include a VMM. After the boot up procedure, the MTPM may work as a though it were a TPM microchip within the first host device. In some embodiments the first virtual machine may connect to the host device using a client-server mode. In some embodiments where the storage capacity of the MTPM device is limited, such as where the MTPM device is a cell phone, the VM may rely on external web based software to store and retrieve the encrypted VM image.

At step 375 software modules in the VM may provide measurements of the VM back to the MTPM to ensure it is not improperly modified. In some embodiments, the VM measurement may be stored in PCR 9. The MTPM may also decrypt any portions of the VM that were further encrypted upon request from the host device.

An example embodiment of this process may be as follows. A user has an MTPM equipped with a USB interface. The user plugs the MTPM into the USB interface of a host computer. The host computer is booted up. Once the MTPM detects the host is powered up, the MTPM may initiate its internal check. During the host bootup process, the host may recognize the MTPM and call the host MTPM driver. The MTPM driver may confirm the identity of the MTPM and it may verify the measurements by contacting a third party attestation service over a network connection of the host computer. The MTPM driver may send the host computer's identity information and measurements to the MTPM. The MTPM may then verify the measurements of the host computer with a third party attestation service, also using the host computer's network connection. Once verified, the user may be requested by the MTPM to provide identifying information, such as a secret authorization key. If the user is verified as the owner of the MTPM, then the user may be notified that there is an MTPM with a Virtual Machine attached to the host computer. The user may then request that the VM be launched. The MTPM may retrieve the key for the mobile VM image from its internal TPM, decrypt the mobile VM image and allow the host computer to copy the resulting VM to itself. The host computer may launch the VM through its Virtual Machine Monitor and the user can execute any applications contained in the VM. Requests for TPM functions from the application may be routed to and served by the MTPM. When the user is done, the VM is deleted and it can be copied back to the MTPM and encrypted.

Sensitive data may be stored on the MTPM device during the running of the VM. The sensitive data may include such data as encryption keys for application level data structures, sign-on or password information for web services or account numbers. Because the data is stored on the MTPM device, the user may be able to take the data with him and recall it at a later time from a different host device. For example, the user may connect the MTPM device to a second host computer. In doing so the virtual machine may be launched on the second host device with access to the stored sensitive information. Another advantage of storing the data on the MTPM device is that the user does not have to worry about someone else using the host computer to get the encrypted data. Furthermore, because the data is encrypted it may still be protected should the MTPM device be lost or stolen.

Some of the steps illustrated in FIG. 3 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within host computer 1100 and MTPM 1200, these elements may be combined, rearranged or positioned in order to accommodate particular computational needs. In addition, any of these elements may be provided as separate external components to host computer 1100 or MTPM 1200, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for implementing a mobile trusted platform module, comprising:
cryptographically binding a virtual machine to a trusted platform module;
establishing a connection with a first remote host device via a remote interface;
authenticating and validating a configuration of the first remote host device;
authenticating a user's ownership of a mobile trusted platform module;
determining whether the first remote host device comprises a trusted platform module (TPM) microchip;
upon determining the first remote host device comprises a TPM microchip, storing at least one platform configuration register (PCR) value from the TPM microchip within a corresponding internal PCR;
upon determining the first remote host device does not comprise a TPM microchip, setting at least one internal PCR to NULL;
securely storing configuration information;
allowing the first remote host device to copy and execute a first application securely stored within the virtual machine;
receiving a shared authentication secret for a storage root key pair;
creating a storage root key pair;
binding the storage root key pair to the shared authentication secret;
generating a key;
encrypting the virtual machine using the generated key;
wrapping the generated key using one storage root key of the storage root key pair; and
storing encrypted data, the encrypted data maintained after the connection with the first remote host device is terminated.

2. The method of claim 1, wherein, storing at least one platform configuration register (PCR) value from the TPM microchip within a corresponding internal PCR comprises copying at least one platform configuration register (PCR) value from the TPM microchip to a corresponding internal PCR of an internal TPM microchip of the mobile trusted platform module.

3. A method for implementing a mobile trusted platform module, comprising:
establishing a connection between a mobile trusted platform module and a first remote host device via a remote interface, wherein the mobile trusted platform module is a portable device configured to be moved between host devices;
authenticating the connection;
configuring the mobile trusted platform module, comprising:
determining whether the first remote host device comprises a trusted platform module (TPM) microchip;
identifying one or more configuration parameters associated with the TPM microchip;
configuring the mobile trusted platform module with the one or more configuration parameters associated with the TPM microchip;
upon authenticating the connection and configuring the mobile trusted platform module:
allowing the first remote host device to access a securely stored first application within the mobile trusted platform module, and
securely storing data within the mobile trusted platform module while connected with the first remote host device; and
after the connection has been terminated and the mobile trusted platform module has been moved from the first remote host device to a second remote host device:
establishing a second connection between the mobile trusted platform module and the second remote host device via a second remote interface;
authenticating the second connection; and
upon authenticating the second connection, allowing the second remote host device to access the securely stored first application and the securely stored data within the mobile trusted platform module.

4. The method of claim 3, wherein authenticating the connection comprises authenticating and validating a configuration of the first remote host device.

5. The method of claim 3, wherein authenticating the connection comprises authenticating a user's ownership of a mobile trusted platform module.

6. The method of claim 3, further comprising cryptographically binding a mobile virtual machine to a trusted platform module.

7. The method of claim 3, further comprising securely storing configuration information.

8. The method of claim 3, wherein authenticating the connection comprises requesting a third party to authenticate the connection.

9. The method of claim 3, wherein the securely stored first application comprises a securely stored first application included within a virtual machine.

10. The method of claim 3, wherein authenticating the connection comprises internally authenticating the connection.

11. The method of claim 3, further comprising storing encrypted data, the encrypted data maintained after the connection with the first remote host device is terminated.

12. The method of claim 3, further comprising:
receiving a shared authentication secret for a storage root key pair;
creating a storage root key pair;
binding the storage root key pair to the shared authentication secret;
generating a key;
encrypting a virtual machine using the generated key; and
wrapping the generated key using one storage root key of the storage root key pair.

13. The method of claim 3, wherein allowing the first remote host device to access a securely stored first application comprises allowing the first remote host device to copy and execute the securely stored first application.

14. A method for implementing a mobile trusted platform module, comprising:
running a virtual machine monitor;
establishing a connection with a mobile trusted platform module (MTPM) device via a remote interface;
authenticating and validating a configuration of the MTPM device;
authenticating and validating a configuration of a host device;
configuring the MTPM device, comprising:
identifying a trusted platform module (TPM) microchip;
identifying one or more configuration parameters associated with the TPM microchip;
configuring the MTPM device with the one or more configuration parameters associated with the TPM microchip;
launching a first virtual machine from the MTPM device;
monitoring the first virtual machine via the virtual machine monitor; and
running at least one application within the first virtual machine.

15. The method of claim 14, wherein validating the configuration of the MTPM device comprises internally validating the configuration of the MTPM device.

16. The method of claim 14, wherein the MTPM device serves as a trusted platform module for the first virtual machine.

17. The method of claim 14, wherein the first virtual machine is encrypted on the MTPM device.

18. The method of claim 14, further comprising measuring a mobile core root of trust stored within the MTPM device.

19. The method of claim 14, further comprising determining whether a request for a TPM function is for an internal TPM microchip or the MTPM device.

20. The method of claim 14, further comprising receiving from the MTPM device a request for at least one platform configuration register (PCR) value from an internal TPM microchip.

21. The method of claim 14, further comprising;
measuring at least one component of the first virtual machine; and
storing the measurement of the at least one component of the first virtual machine in at least one internal platform configuration register.

22. A system for implementing a mobile trusted platform module, comprising:
an interface operable to establish a connection between a mobile trusted platform module and a first remote host device via a remote interface, wherein the mobile trusted platform module is a portable device configured to be moved between host devices; and
a processor, hardware device coupled to the interface and operable to:
authenticate the connection;
configure the mobile trusted platform module, wherein configuring the mobile trusted platform module comprises:
determining whether the first remote host device comprises a trusted platform module (TPM) microchip;
identifying one or more configuration parameters associated with the TPM microchip;
configuring the mobile trusted platform module with the one or more configuration parameters associated with the TPM microchip;
wherein the interface is further operable to, upon the processor device authenticating the connection and configuring the mobile trusted platform module:
allow the first remote host device to access a securely stored first application within a mobile trusted platform module; and
receive data to be securely stored within the mobile trusted platform module while connected with the first remote host device;
wherein the interface is further operable to establish a second connection between the mobile trusted platform module and a second remote host device via a second remote interface after the connection with the first remote host device has been terminated and the mobile trusted platform module has been moved from the first remote host device to the second remote host device;
wherein the processor device is further operable to authenticate the second connection; and
wherein the interface is further operable to allow the second remote host device to access the securely stored first application and the securely stored data within the mobile trusted platform module.

23. The system of claim 22, wherein the processor device operable to authenticate the connection comprises a processor device operable to authenticate and validate a configuration of the first remote host device.

24. The system of claim 22, wherein the processor device operable to authenticate the connection comprises a processor device operable to authenticate a user's ownership of a mobile trusted platform module.

25. The system of claim 22, wherein the interface is further operable to cryptographically bind a mobile virtual machine to a trusted platform module .

26. The system of claim 22, wherein the processor device is further operable to securely store configuration information.

27. The system of claim 22, wherein the processor device operable to authenticate the connection comprises a processor device operable to request a third party to authenticate the connection.

28. The system of claim 22, wherein the securely stored first application comprises a securely stored first application included within a virtual machine.

29. The system of claim 22, wherein the processor device operable to authenticate the connection comprises a processor device operable to internally authenticate the connection.

30. The system of claim 22, wherein the processor device is further operable to store encrypted data, the encrypted data maintained after the connection with the first remote host device is terminated.

31. The system of claim 22, wherein:
the interface is further operable to receive a shared authentication secret for a storage root key pair; and
the processor device is further operable to:
create a storage root key pair;
bind the storage root key pair to the shared authentication secret;
generate a key;
encrypt a first virtual machine using the generated key; and
wrap the generated key using one storage root key of the storage root key pair.

32. The system of claim 22, wherein the interface operable to allow the first remote host device to access a securely stored first application comprises an interface operable to allow the first remote host device to copy and execute the securely stored first application.

33. A system for implementing a mobile trusted platform module, comprising:
a processor, hardware device operable to run a virtual machine monitor; and
an interface coupled to the processor device operable to establish a connection with a mobile trusted platform module (MTPM) device via a remote interface;
wherein the processor device is further operable to:
authenticate and validate a configuration of the MTPM device;
authenticate and validate a configuration of a host device;
configure the MTPM device, wherein configuring the MTPM device comprises:
determining whether a trusted platform module (TPM) microchip is associated with the processor;
identifying one or more configuration parameters associated with the TPM microchip;
configuring the MTPM device with the one or more configuration parameters associated with the TPM microchip;
launch a first virtual machine from the MTPM device;
monitor the first virtual machine via the virtual machine monitor; and
run at least one application within the first virtual machine.

34. The method of claim 33, wherein validating the configuration of the MTPM device comprises internally validating the configuration of the MTPM device.

35. The system of claim 33, wherein the MTPM device serves as a trusted platform module for the first virtual machine.

36. The system of claim 33, wherein the first virtual machine is encrypted on the MTPM device.

37. The system of claim 33, wherein the processor is further operable to measure a mobile core root of trust stored within the MTPM device.

38. The system of claim 33, wherein the processor is further operable to determine whether a request for a TPM function is for an internal TPM microchip or the MTPM device.

39. The system of claim 33, wherein the interface is further operable to receive from the MTPM device a request for at least one platform configuration register (PCR) value from an internal TPM microchip.

40. The system of claim 33, wherein the processor is further operable to:
measure at least one component of the first virtual machine; and
store the measurement of the at least one component of the first virtual machine in at least one internal platform configuration register.

* * * * *